US012779342B2

(12) United States Patent
Chiba et al.

(10) Patent No.: US 12,779,342 B2
(45) Date of Patent: Nov. 3, 2026

(54) CONTROL SYSTEM, OPERATION METHOD FOR CONTROL SYSTEM, AND RECORDING MEDIUM

(71) Applicant: Konami Digital Entertainment Co., Ltd., Tokyo (JP)

(72) Inventors: Shigeru Chiba, Tokyo (JP); Akira Sakai, Tokyo (JP); Junki Hirai, Tokyo (JP); Kai Inoue, Tokyo (JP); Tsuguo Shinpo, Tokyo (JP); Toshiaki Kanahara, Tokyo (JP); Yoshihiko Narita, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 587 days.

(21) Appl. No.: 18/091,752

(22) Filed: Dec. 30, 2022

(65) Prior Publication Data

US 2023/0132944 A1 May 4, 2023

Related U.S. Application Data

(63) Continuation of application No. PCT/JP2021/026971, filed on Jul. 19, 2021.

(30) Foreign Application Priority Data

Jul. 31, 2020 (JP) ................................ 2020-130457

(51) Int. Cl.
*A63F 13/48* (2014.01)
*A63F 13/355* (2014.01)
(Continued)

(52) U.S. Cl.
CPC .......... *A63F 13/795* (2014.09); *A63F 13/355* (2014.09); *A63F 13/48* (2014.09);
(Continued)

(58) Field of Classification Search
None
See application file for complete search history.

(56) References Cited

U.S. PATENT DOCUMENTS 7,070,506 B1 * 7/2006 Ropp .................... A63F 13/335 463/29
2003/0190960 A1 * 10/2003 Jokipii .................... G07F 17/32 463/42
(Continued)

FOREIGN PATENT DOCUMENTS

CN 109152956 A 1/2019
JP 2006-506182 A 2/2006
(Continued)

OTHER PUBLICATIONS

Japanese Office Action issued Mar. 12, 2024 in Application No. 2020-130457.
(Continued)

*Primary Examiner* — Damon J Pierce
(74) *Attorney, Agent, or Firm* — Sughrue Mion, PLLC

(57) ABSTRACT

A control system includes: at least one memory that stores a program; and at least one processor that implements the program to: manage a contest in which a plurality of participants play a competitive video game; accept a registration request of each of a plurality of users; and determine a pair of (i) any participant of the plurality of participants and (ii) any user of the plurality of users. The pair will be players of the competitive video game.

20 Claims, 12 Drawing Sheets

(51) Int. Cl.
*A63F 13/69* (2014.01)
*A63F 13/795* (2014.01)
*A63F 13/798* (2014.01)
*A63F 13/86* (2014.01)

(52) U.S. Cl.
CPC ............ *A63F 13/69* (2014.09); *A63F 13/798* (2014.09); *A63F 13/86* (2014.09)

(56) References Cited

U.S. PATENT DOCUMENTS

| | | | | |
|---|---|---|---|---|
| 2005/0192097 | A1* | 9/2005 | Farnham | A63F 13/335 463/42 |
| 2017/0001111 | A1* | 1/2017 | Willette | A63F 13/49 |
| 2017/0154494 | A1 | 6/2017 | Cire et al. | |
| 2021/0023453 | A1* | 1/2021 | DeVico | A63F 13/798 |
| 2022/0314127 | A1* | 10/2022 | Konishi | A63F 13/86 |
| 2023/0051099 | A1* | 2/2023 | Wu | A63F 13/86 |

FOREIGN PATENT DOCUMENTS

| | | | |
|---|---|---|---|
| JP | 2014-176401 | A | 9/2014 |
| JP | 5856096 | B2 | 2/2016 |
| JP | 2019-80816 | A | 5/2019 |
| JP | 2020-044086 | A | 3/2020 |
| KR | 10-2020-0021856 | A | 3/2020 |

OTHER PUBLICATIONS

Communication dated Oct. 22, 2024 in Korean Application No. 10-2023-7005838.

International Search Report dated Sep. 21, 2021 in International Application No. PCT/JP2021/026971.

Written Opinion dated Sep. 21, 2021 in International Application No. PCT/JP2021/026971.

Communication dated Jul. 8, 2025 issued by Japanese Patent Office in Application No. 2024-121353.

Japanese Office Action dated Nov. 18, 2025, issued in Japanese application No. 2024-121353.

Chinese Office Action dated Feb. 25, 2026, issued in Chinese application No. 202180058584.6.

Japanese Office Action dated Apr. 7, 2026, issued in Japanese application No. 2024-121353.

Communication dated Jul. 10, 2026, issued in Chinese Application No. 202180058584.6.

Office Action dated Sep. 12, 2026, issued in Chinese Application No. 202180058584.6. English translation.

* cited by examiner

CONTROL SYSTEM, OPERATION METHOD FOR CONTROL SYSTEM, AND RECORDING MEDIUM

CROSS REFERENCE TO RELATED APPLICATIONS

This Application is a Continuation Application of PCT Application No. PCT/JP2021/026971, filed on Jul. 19, 2021, and is based on and claims priority from Japanese Patent Application No. 2020-130457, filed on Jul. 31, 2020, the entire contents of each of which are incorporated herein by reference.

BACKGROUND

Field of the Invention

The present disclosure relates to video games.

Description of Related Art

A variety of techniques have been proposed to determine players who will play against each other (a pair of players) in various video games. For example, Patent Document 1 (Japanese Patent No. 5856096) discloses a technique for determining players: a pair of a specific user, such as a professional Mahjong player, and an ordinary user other than this specific user.

For the purpose of promotion of competitive video games played by participants, contests (i.e., Esports events) are held. However, spectators only watch the competition, and it is difficult to motivate a large number of users to play such a video game.

SUMMARY

In view of the above circumstances, the present disclosure is to motivate a large number of users to play the video game.

To achieve the stated object, a control system according to one aspect of this disclosure includes: at least one memory that stores a program; and at least one processor that implements the program to: manage a contest in which a plurality of participants play a competitive video game; accept a registration request of each of a plurality of users; and determine a pair of any participant of the plurality of participants and any user of the plurality of users, in which the pair will be players of the competitive video game.

A computer-implemented operation method for a control system according to another aspect of this disclosure is an operation method including: managing a contest in which a plurality of participants play a competitive video game; accepting, a registration request of each of a plurality of users; and determining a pair of any participant of the plurality of participants and any user of the plurality of users, in which the pair will be players of the competitive video game.

A recording medium according to another aspect of this disclosure is a non-transitory computer-readable recording medium having a program stored therein that cause at least one processor of a computer system to: manage a contest in which a plurality of participants play a competitive video game; accept a registration request of each of a plurality of users; and determine a pair of any participant of the plurality of participants and any user of the plurality of users, in which the pair will be players of the competitive video game.

DESCRIPTION OF THE EMBODIMENT

Description will be given of embodiments according to the present disclosure with reference to the drawings. The following embodiments include various technically suitable limitations. The scope of the present invention is not limited to the embodiments below.

First Embodiment

Figure 1:
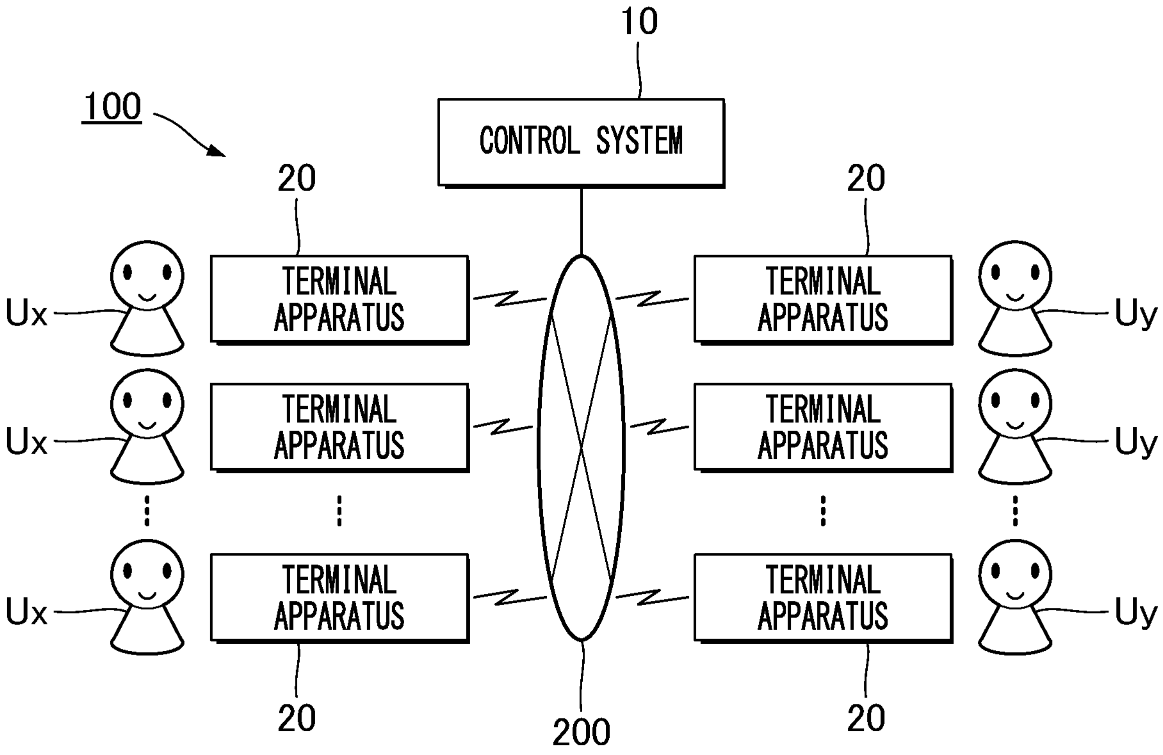
FIG. 1 is a block diagram showing an example of a configuration of an information system according to a first embodiment.

FIG. 1 is a block diagram showing an example of a configuration of an information system 100 according to the first embodiment. The information system 100 is a computer system that provides users U (Ux and Uy) with a video game. The users U include participants Ux and spectators Uy. The participants Ux are those among the users U who take part in a match contest. The match contest is one of the Esports, in which the participants Ux play a competitive video game to compete with others. The competitive video game is a battle video game, in which two of the participants Ux are selected as players and play against each other.

The spectators Uy watch a distribution video V (see FIG. 8) of the match contest as the users U. The distribution video V is content that shows the situation of the contest, and it is distributed in real time (i.e., live broadcasting) in conjunction with the progress of the match contest. Each spectator Uy watches the distribution video V in conjunction with the progress of the match contest. In the first embodiment, each spectator Uy can play the competitive video game to compete against any one of the participants Ux in a special contest that will be held after the end of the match contest. The special contest is an excision event relative to the match contest.

As shown in FIG. 1, the information system 100 includes a control system 10 and terminal apparatuses 20. Each terminal apparatus 20 is used by different users U (participant Ux or spectator Uy). Examples of the terminal apparatus 20 include a smartphone, an information device, such as a tablet or a personal computer. The terminal apparatuses 20 may be video game consoles. The terminal apparatuses 20 may be portable or stationary. The control system 10 is a computer system that manages match contests and special contests. The control system 10 communicates with each terminal apparatus 20 via a network 200, such as the Internet.

Figure 2:
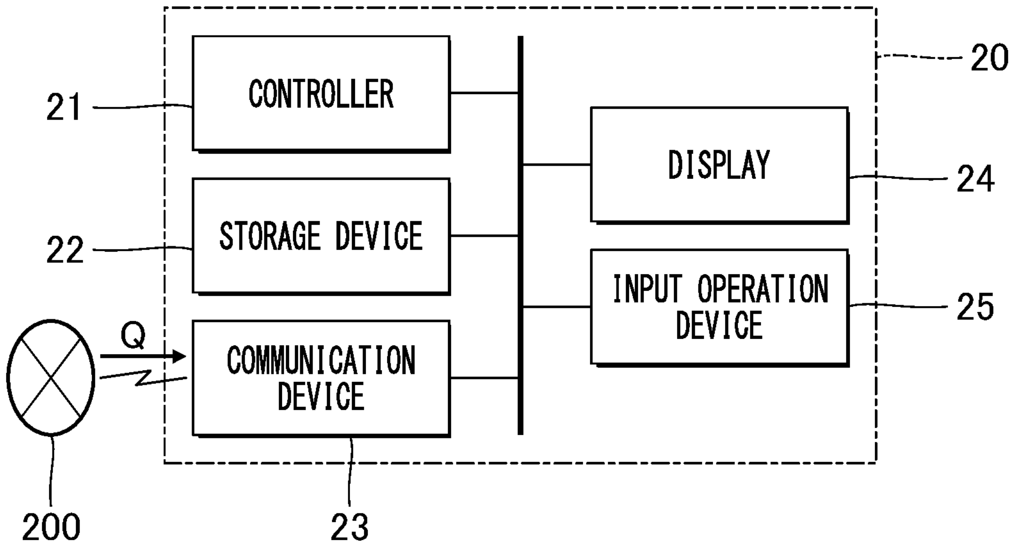
FIG. 2 is a block diagram showing an example of a configuration of each terminal apparatus.

FIG. 2 is a block diagram showing an example of a configuration of each terminal apparatus 20. As shown in FIG. 2, each terminal apparatus 20 includes a controller 21, a storage device 22, a communication device 23, a display 24, and an input operation device 25. Each terminal apparatus 20 may be a single device, or it may be more than one device, each independent from the others.

The controller 21 is composed of one or more processors that control each element of the terminal apparatus 20. The controller 21 comprises one or more types of processors, such as a Central Processing Unit (CPU), a Graphics Processing Unit (GPU), a Digital Signal Processor (DSP), a Field Programmable Gate Array (FPGA), or an Application Specific Integrated Circuit (ASIC).

The storage device 22 comprises one or more memories that store a program executed by the controller 21, and various data used by the controller 21. In one example, a known recording medium, such as a semiconductor recording medium and a magnetic recording medium, or a combination of a variety of recording mediums, is used as the storage device 22. A portable recording medium to be attached to, or to be detached from, the terminal apparatus 20, or a recording system to be connected to the network 200 (e.g., cloud storage) may be used as the storage device 22.

The communication device 23 communicates with the control system 10 via the network 200. Specifically, the communication device 23 receives video data Q representative of the distribution video V of the match contest from the control system 10 via the network 200.

The display 24 displays an image under control of the controller 21. The display 24 includes a display panel, such as a liquid crystal panel or an organic EL panel. The input operation device 25 is an input device that receives instructions from the user U (participant Ux or spectator Uy). In one example, an operational element to be operated by the user U or a touch panel that is a one-piece body with the display 24 is used as the input operation device 25.

Figure 3:
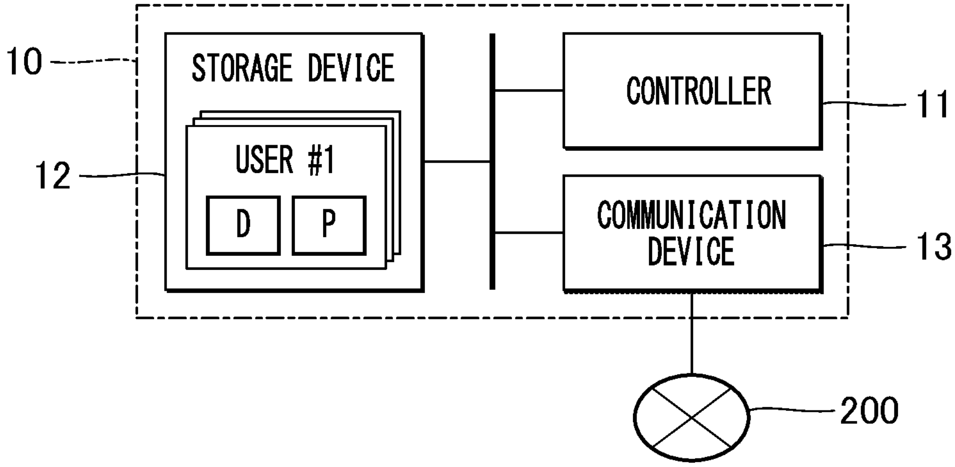
FIG. 3 is a block diagram showing an example of a configuration of a control system.

FIG. 3 is a block diagram showing an example of a configuration of the control system 10. As shown in FIG. 3, the control system 10 includes a controller 11, a storage device 12, and a communication device 13. The control system 10 may be a single device, or it may be more than one device, each independent from the others.

The controller 11 is comprised of, for example, one or more processors that control each element of the control system 10. Specifically, the controller 11 comprises one or more types of processors, such as a CPU, a GPU, a DSP, a FPGA, or an ASIC. The communication device 13 communicates with each terminal apparatus 20 via the network 200.

The storage device 12 is one or more memories for storing programs executed by the controller 11 and various data used by the controller 11. In one example, a known recording medium, such as a semiconductor recording medium and a magnetic recording medium, or a combination of a variety of recording mediums, is used as the storage device 12. A portable recording medium to be attached to, or to be detached from, the control system 10, or a recording system (e.g., cloud storage) to be connected to the network 200 may be used as the storage device 12.

The storage device 12 according to the first embodiment stores identification information D about each user U, and points P thereof. The identification information D is a sequence of codes for identifying each user U. The points P are virtual valuable objects that are usable for the user U in the competitive video game. Each user U can enjoy various benefits in exchange for the points P, such as acquisition of items and characters usable in the competitive video game, or acquisition of rights to play a special video game.

Figure 4:
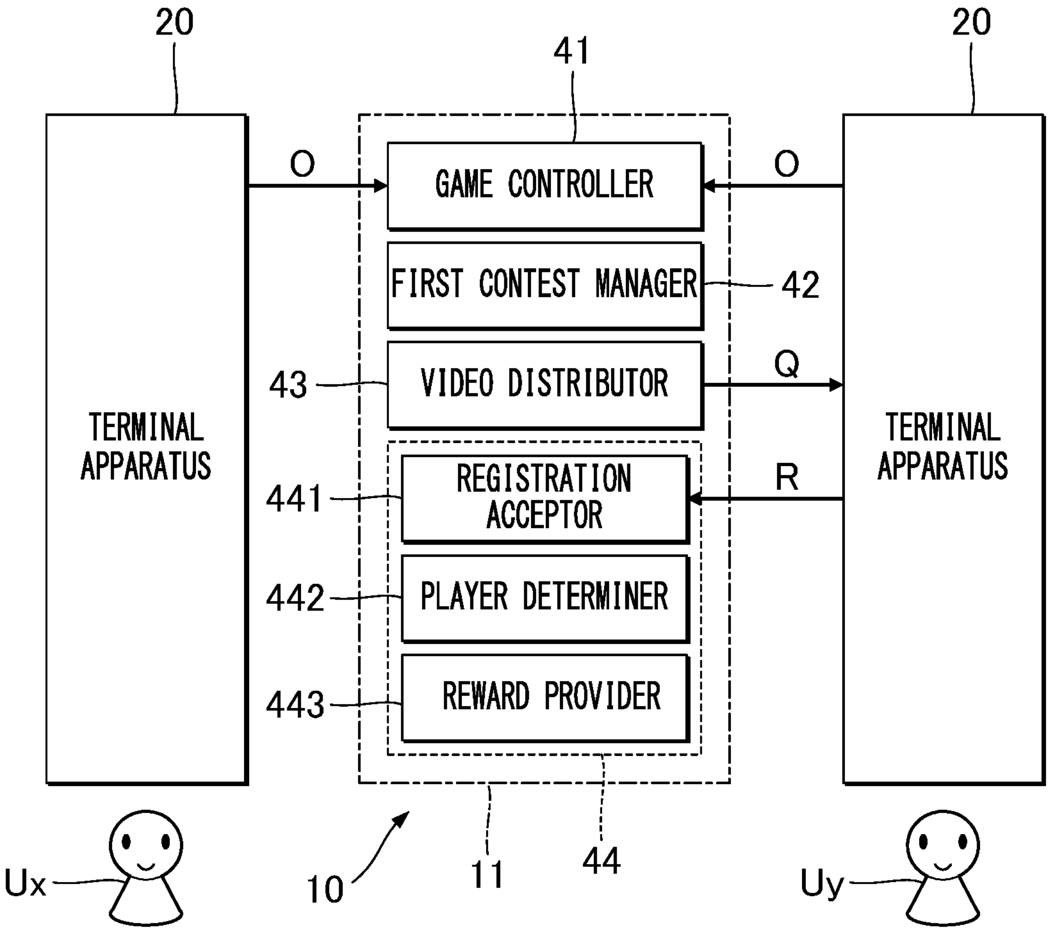
FIG. 4 is a block diagram showing an example of a functional configuration of the control system.

FIG. 4 is a block diagram showing an example of a functional configuration of the control system 10. As shown in FIG. 4, the controller 11 of the control system 10 implements functions (game controller 41, first contest manager 42, video distributor 43 and second contest manager 44) by executing a program stored in the storage device 12.

Figure 5:
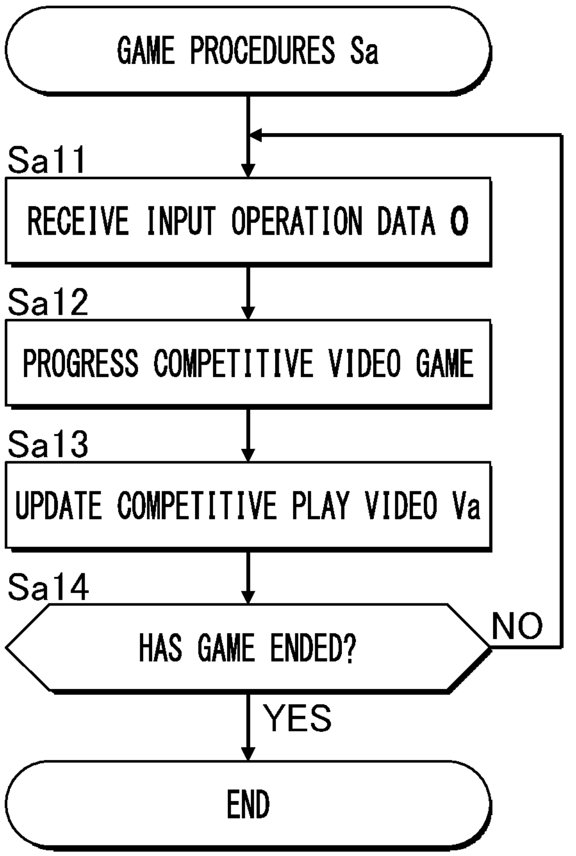
FIG. 5 is a flowchart showing an example of game procedures.

The game controller 41 controls progress of the competitive video game when the match contest and the special contest are being held. FIG. 5 is a flowchart of an example of procedures Sa executed by the game controller 41 (hereafter, "game procedures"). By the game procedures Sa, a match (competitive video game) played by two users U is progressed. In the match contest, a match is played by two participants Ux. In the special contest, a match is played by a participant Ux and a spectator Uy.

When the game procedures Sa have started, the game controller 41 receives input operation data O via the communication device 13 from each terminal apparatus 20 of the user U who is playing the competitive video game (Sa11).

The input operation data O represents a user U's instruction to the corresponding input operation device 25. The game controller 41 progresses the competitive video game (match) based on the input operation data O received from each terminal apparatus 20 (Sa12). The game controller 41 displays a competitive play video Va on the display 24 of each terminal apparatus 20 of the user U. The game controller 41, then, updates the competitive play video Va based on the situation of the competitive video game (match) (Sa13).

Figure 6:
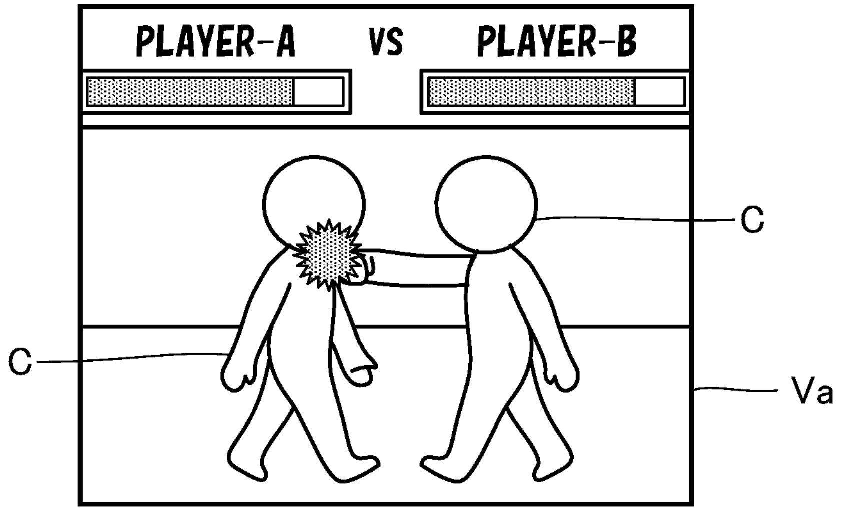
FIG. 6 is a schematic diagram of a competitive video.

As shown in FIG. 6, the competitive play video Va shows the situation of a match (competitive video game). Specifically, the competitive play video Va includes characters C disposed in the virtual space. Each user U who plays the competitive video game operates the user's character C with the input operation device 25 of the terminal apparatus 20 to proceed the competitive video game.

As shown in FIG. 5, the game controller 41 determines whether the competitive video game (match) has ended (Sa14). In one example, when one of the users U has defeated the other user by reducing the power of the other character C down to zero, it is determined that the competitive video game has ended. Until the competitive video game is ended (Sa14: NO), the following are repeated: reception of the input operation data O (Sal 1), progress of the competitive video game (Sa12), and update of the competitive play video Va (Sa13).

Figure 7:
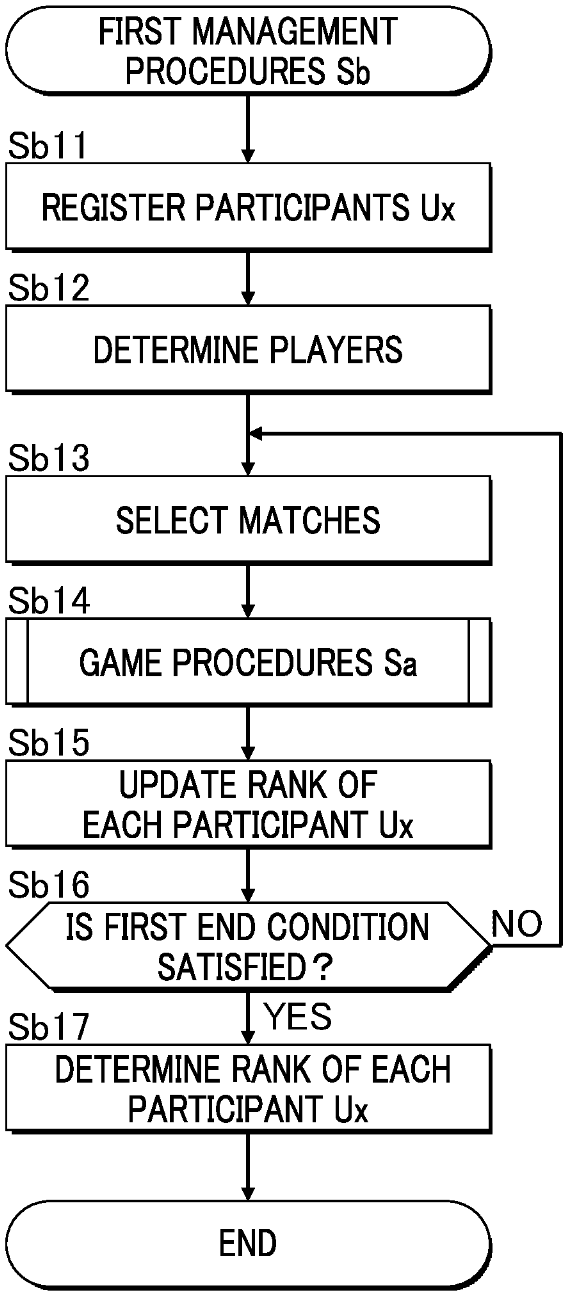
FIG. 7 is a flowchart showing an example of first management procedures.

The first contest manager 42 shown in FIG. 4 manages the progress of the match contest. FIG. 7 is a flow chart of an example of procedures Sb for managing progress of the match contest (hereafter, "first management procedures"). The first management procedures Sb are performed within a duration of the match contest. In one example, in response to an instruction made by the operator of the match contest, the controller 11 starts the first management procedures Sb with the start of the match contest.

When the first management procedures Sb have started, the first contest manager 42 performs registration of participants Ux who will take part in the match contest (Sb11). Specifically, in response to requests from the terminal apparatuses 20 of the participants Ux, the first contest manager 42 performs registration of the participants Ux by various processes, such as authentication of the participants Ux. The first contest manager 42 determines a pair of players (i.e., a pair of two participants Ux who will play against each other) of each match in the match contest (Sb12). Thus, a tournament table or a league table for the match contest is set.

The first contest manager 42 selects the matches scheduled in the match contest one by one (Sb13). The game controller 41 executes the game procedures Sa for the match selected by the first contest manager 42 (Sb14). By the game procedures Sa, the match (competitive video game) played by two participants Ux, who are determined as the players, is progressed. Then, it is determined that one of the participants Ux is the winner based on the result of the progress. The first contest manager 42 updates the rank of each participant Ux based on the result of the match (competitive video game) (Sb15).

The first contest manager 42 determines whether a condition for the end of the match contest (hereafter, "first end condition") is satisfied (Sb16). In one example, the first end condition is defined as the end of all of the scheduled matches. When the first end condition is not satisfied (Sb16: NO), the first contest manager 42 selects the next match among from the matches (Sb13), and the game controller 41 executes the game procedures Sa relating to the selected match (Sb14). Until the first end condition is satisfied, the progress of the competitive video game (Sb13 and Sb14) and the update of the rank of each participant Ux (Sb15) are repeated. When the first end condition is satisfied (Sb16: YES), the first contest manager 42 determines the rank of each participant Ux (Sb17). As will be apparent from this description, in the first embodiment, the first contest manager 42 manages grades (i.e., ranks) of the participants Ux who took part in the match contest.

The video distributor 43 shown in FIG. 4 distributes the distribution video V to the terminal apparatuses 20. Specifically, the video distributor 43 generates video data Q representative of the distribution video V, and it transmits the video data Q to each terminal apparatus 20 via the communication device 13. The video distributor 43 distributes the distribution video V in real time (i.e., live-broadcasting) to each terminal apparatus 20 in conjunction with the progress of the match contest.

Figure 8:
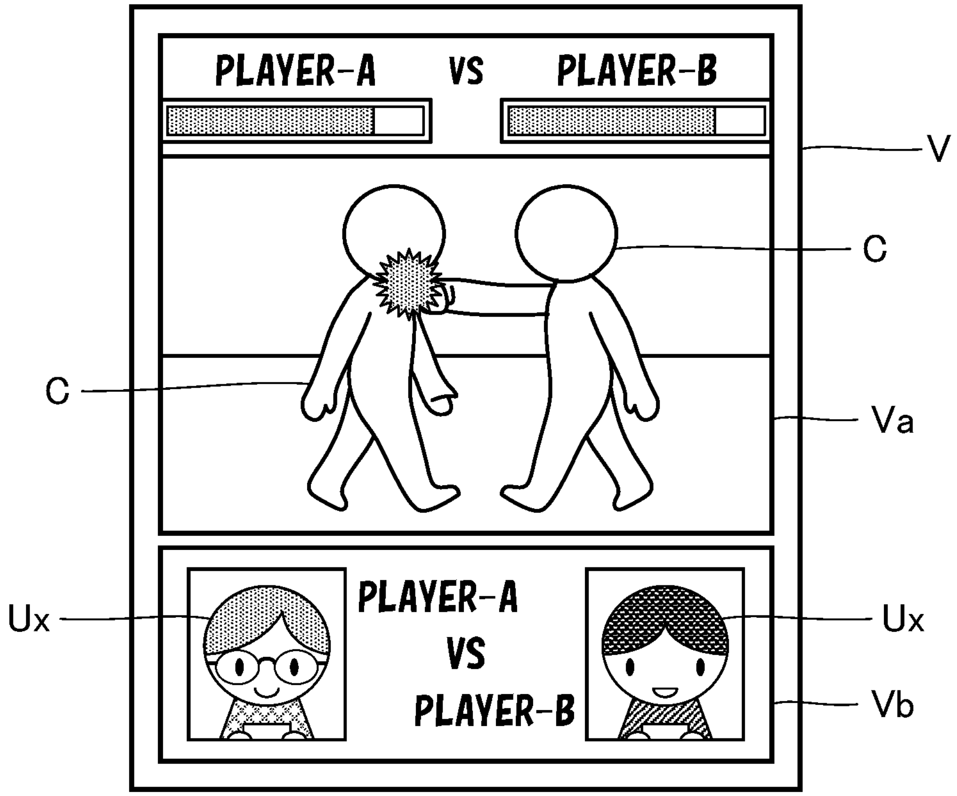
FIG. 8 is a schematic diagram of a distribution video.

FIG. 8 is a schematic diagram of a distribution video V. As shown in FIG. 8, the distribution video V is content that include a competitive play video Va and a relevant video Vb. As described with reference to FIG. 6, the competitive play video Va represents the situation of the match (competitive video game). The relevant video Vb relates to the match contest. Specifically, the relevant video Vb shows that the participants Ux are playing the competitive video game in the match contest. The relevant video Vb is recorded by a recording system that is set in the venue at which the match contest is held (not shown). In FIG. 8, an example is given in which the distribution video V includes the same competitive play video Va viewed by the participants Ux. However, the competitive play video Va included in the distribution video V may differ from the competitive play video Va viewed by the participants Ux. The relevant video Vb may be omitted from the distribution video V.

Figure 9:
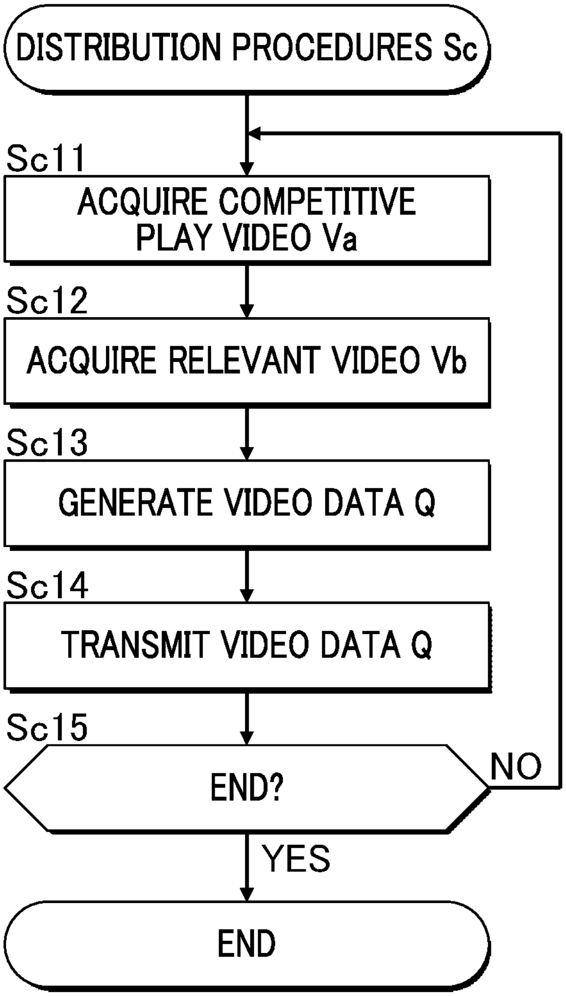
FIG. 9 is a flowchart showing an example of distribution procedures.

FIG. 9 is a flowchart showing an example of procedures Sc for distributing a distribution video V by the video distributor 43 (hereafter, "distribution procedures"). The distribution procedures Sc are executed within a duration of the match contest in conjunction with the progress of the match contest. That is, the distribution procedures Sc are executed in conjunction with the first management procedures Sb. In one example, in response to an instruction from the operator of the match contest, the controller 11 starts the distribution procedures Sc with the start of the match contest.

When the distribution procedures Sc have started, the video distributor 43 acquires a current competitive play video Va from the game controller 41 (Sc11). Furthermore the video distributor 43 acquires a current relevant video Vb from the recording system (Sc12). The video distributor 43 performs various image processing, such as image synthesis, to generate video data Q representative of a distribution video V including the competitive play video Va and the relevant video Vb (Sc13). The video distributor 43 transmits the video data Q to the terminal apparatuses 20 via the communication device 13 (Sc14).

The video distributor 43 determines whether an instruction to terminate the distribution has been received from the operator (Sc15). When no instruction to terminate the distribution has yet been received (Sc15: NO), the video distributor 43 repeats acquisition of the competitive play video Va (Sc11), acquisition of the relevant video Vb (Sc12), generation of the video data Q (Sc13) and transmission of the video data Q (Sc14). Thus, distribution videos V are distributed (streamed) to terminal apparatuses 20 in conjunction with the progress of the match contest.

The second contest manager 44 shown in FIG. 4 manages progress of the special contest to be performed after the end of the match contest. The second contest manager 44 includes a registration acceptor 441 and a player determiner 442 and a reward provider 443. The registration acceptor 441 accepts registration requests R of one or more spectators Uy. Each registration request R is for registration for participation in a special contest (entry). Specifically, the registration acceptor 441 accepts one or more registration requests R from terminal apparatuses 20 in response to instructions made by the spectators Uy.

The player determiner 442 determines the players for each match in the special contest. Specifically, the player determiner 442 determines a pair of any of the participants Ux who took part in the match contest and any of the spectators Uy whose registration requests R were accepted. The pair of them will be the players of a match in the special contest.

The reward provider 443 provides a reward for the spectator Uy when the spectator Uy has defeated the participant Ux in the match. Specifically, the reward is points P usable in the competitive video game.

Figure 10:
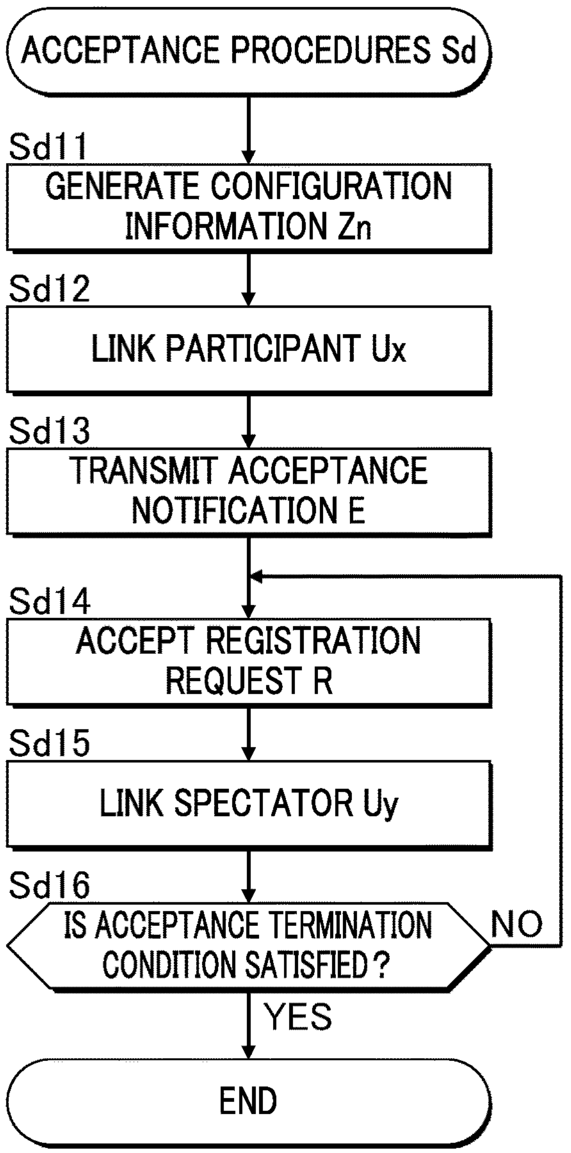
FIG. 10 is a flowchart showing an example of acceptance procedures.

FIG. 10 is a flowchart showing an example of procedures Sd for accepting registration requests R of spectators Uy (hereafter, "acceptance procedures"). In one example, after the end of the match contest, the controller 11 starts the acceptance procedures Sd in response to an instruction made by the operator.

When the acceptance procedures Sd have started, the player determiner 442 generates N pieces of configuration information Z1 to ZN (Sd11). The configuration information Zn (n=1 to N) refers to identification information that is used to identify a virtual location (hereafter, "battle room") at which a participant Ux and a spectator Uy play against each other. The generation (Sd11) of the configuration information Zn means provision of N battle rooms. In one example, the total number N of the pieces of configuration information Zn is set to the total number of participants Ux of the match contest. However, the total number N may be set to a predetermined numerical value. In one example, the total number N is set to "16," which are the top 16 participants Ux in the match contest.

Figure 11:
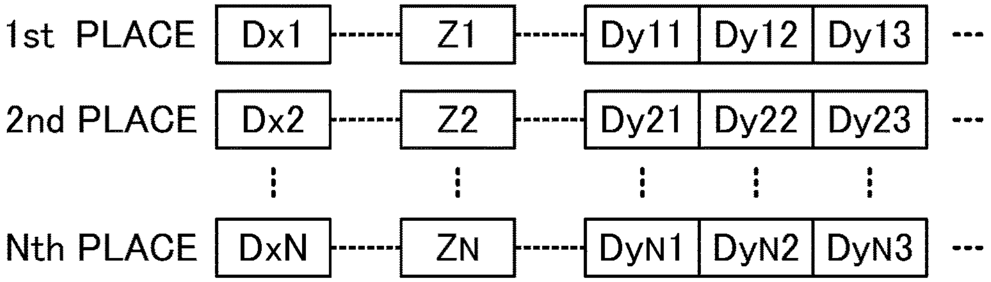
FIG. 11 is an explanatory diagram showing a linkage of a participant with spectators.

The player determiner 442 links each of the N pieces of configuration information Z1 to ZN with one participant Ux (Sd12). As shown in FIG. 11, each piece of identification information Dx (Dx1, Dx2, . . . ) is linked with one piece of configuration information Zn about the participant Ux. In the first embodiment, the player determiner 442 links each of the N pieces of configuration information Z1 to ZN with one of the participants Ux depending on the grades of the match contest. Specifically, the player determiner 442 links the n-th configuration information Zn with identification information Dx about a participant Ux who has the n-th rank of the match contest. The relationship between a piece of configuration information Zn (battle room) and a participant Ux depends on the grade of the participant Ux in the match contest.

The player determiner 442 transmits an acceptance notification E to each terminal apparatus 20 of the spectator Uy (Sd13). The acceptance notification E is a message that is used to notify, to the spectator Uy, the start of the registration relating to the special contest. The acceptance notification E includes N pieces of configuration information Z1 to ZN.

Figure 12:
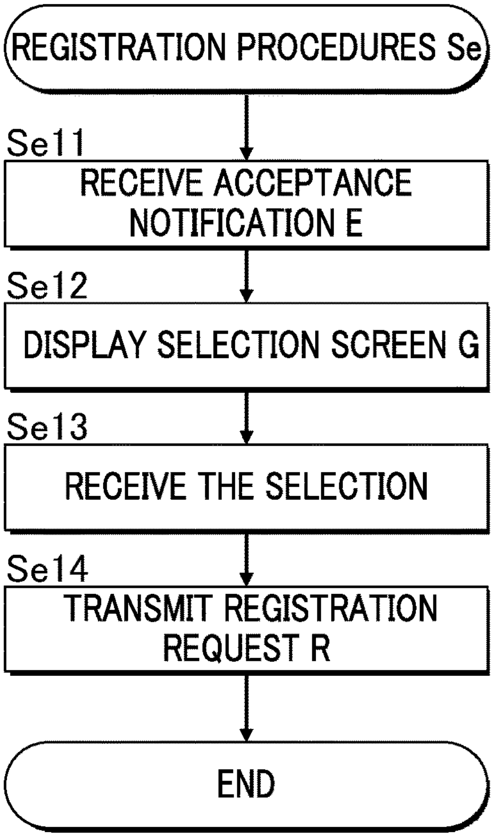
FIG. 12 is a flowchart showing registration procedures.
Figure 13:
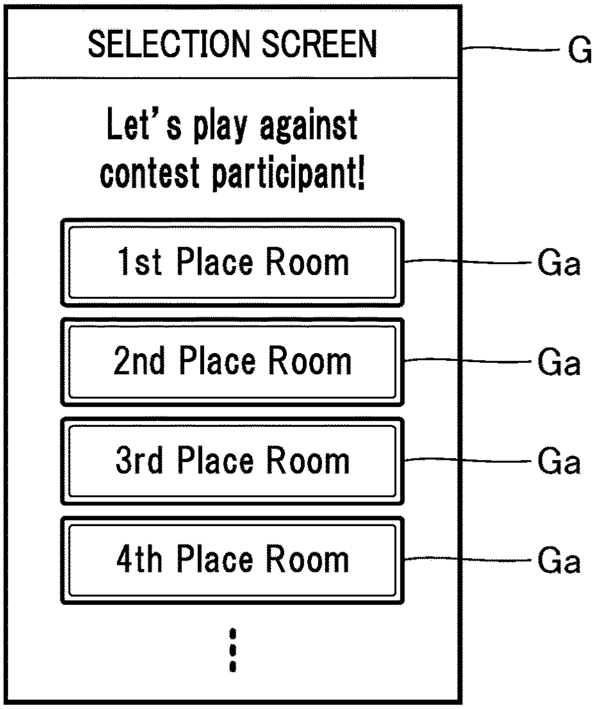
FIG. 13 is a schematic diagram of a selection screen.

FIG. 12 is a flowchart showing an example of procedures Se executed by the controller 21 of each terminal apparatus 20 after the end of the match contest (hereafter, "registration procedures"). The controller 21 of each terminal apparatus 20 receives an acceptance notification E from the control system 10 via the communication device 23 (Se11). The controller 21 displays a selection screen G in FIG. 13 on the display 24 (Se12). The selection screen G is an image that is used by the spectator Uy to select any one of the N battle rooms. Specifically, N options Ga, each of which corresponds to a different battle room (configuration information Zn), are arranged on the selection screen G. Any one of the N options Ga (i.e., any one of the N battle rooms) is selected by the spectator Uy with the input operation device 25. The controller 21 receives the selection by the spectator Uy (Se13).

The controller 21 transmits a registration request R to the control system 10 via the communication device 23 (Se14). The registration request R is a message that is used to request the control system 10 to register the spectator Uy who will take part in the special contest, as described above. The registration request R includes identification information Dy about the spectator Uy, and configuration information Zn about the room selected by the spectator Uy.

As shown in FIG. 10, the registration acceptor 441 of the control system 10 accepts registration requests R of the spectators Uy (Sd14). Specifically, the registration acceptor 441 accepts registration requests R transmitted from the terminal apparatuses 20 of the spectators Uy via the communication device 13.

As shown in FIG. 11, the player determiner 442 links each of the N pieces of configuration information Z1 to ZN with one or more spectators Uy, each of whom owns the terminal apparatus 20 by which a registration request R including the configuration information Zn has been transmitted (Sd15). A piece of identification information Dy (Dyn1, Dyn2, . . . ) about a spectator Uy included in a registration request R is linked with a piece of configuration information Zn indicated by this registration request R. Thus, the player determiner 442 links each piece of configuration information Zn with one or more pieces of identification information Dy about the spectators Uy who selected this configuration information Zn (battle room). As shown in FIG. 11, each piece of configuration information Zn is linked with one or more pieces of identification information Dy (Dyn1, Dyn2, and . . . ) about spectators Uy who selected this configuration information Zn (battle room) in order of the acceptance of the registration requests R. As is apparent from this description, in response to acceptance of a registration request R, a spectator Uy corresponding to this registration request R is registered as a challenger to the participant Ux.

The registration acceptor 441 determines whether a predetermined condition for terminating acceptance of registration requests R (hereafter, "condition of acceptance termination") has been satisfied (Sd16). In one example, the condition of acceptance termination is defined as a predetermined time having elapsed from the start of the acceptance procedures Sd, or the number of the registration requests R received having reached a predetermined numerical value. When the condition of acceptance termination is not satisfied (Sd16: NO), the acceptance of registration requests R (Sd14) and the linking of the identification information Dy with the configuration information Zn (Sd15) are repeated. When the condition of acceptance termination is satisfied (Sd16: YES), the controller 11 terminates the acceptance procedures Sd.

Figure 14:
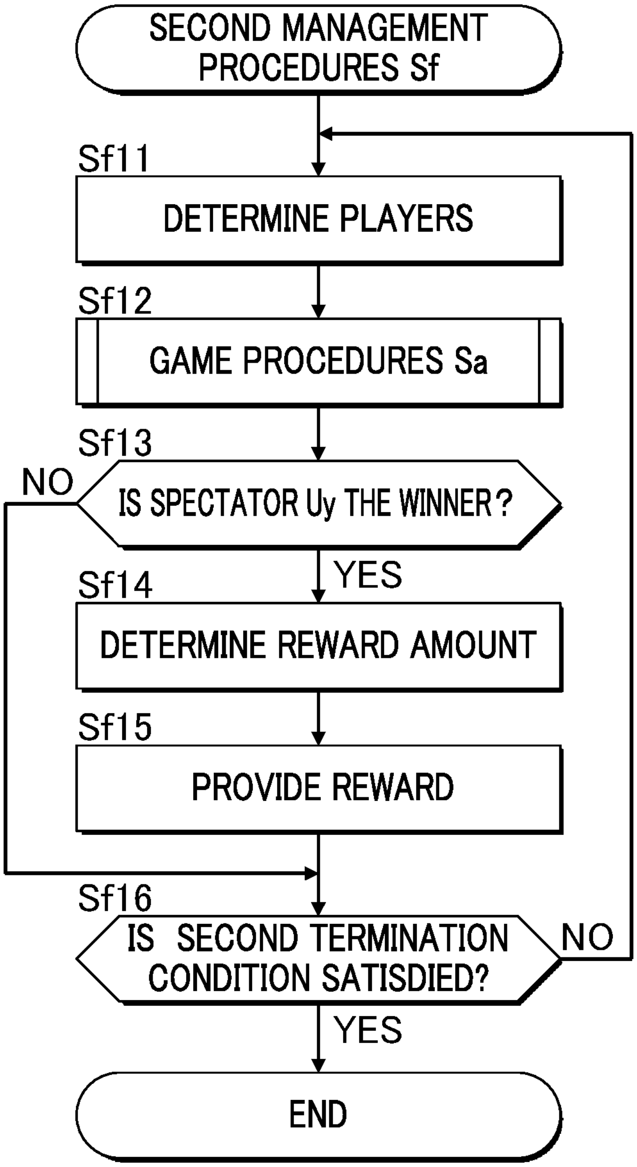
FIG. 14 is a flowchart showing an example of second management procedures.

FIG. 14 is a flowchart showing an example of procedures Sf for progressing a competitive video game (match) in the special contest (hereafter, "second management procedures"). In one example, after the end of the acceptance procedures Sd, the controller 11 starts the second management procedures Sf in response to an instruction made by the operator. The second management procedures Sf are executed for each of the N pieces of configuration information Z1 to ZN (i.e., for each of the N battle rooms) in parallel. For convenience, description will be given below of the second management procedures Sf for one piece of configuration information Zn.

When the second management procedures Sf have started, the player determiner 442 determines a pair of a participant Ux and a spectator Uy. The pair of them will be players of the competitive video game (Sf11). Specifically, the player determiner 442 determines a pair of a participant Ux linked with configuration information Zn and a spectator Uy linked with this configuration information Zn. The pair of them will be players. When a piece of configuration information Zn is linked with more than one spectator Uy, the player determiner 442 selects the first spectator Uy who has not yet played against the participant Ux from among the spectators Uy. The first spectator Uy will be an opponent player who competes with the participant Ux. As described above, each of the pieces of configuration information Zn is linked with a participant Ux depending on the grade of the participant Ux in the match contest. The player determiner 442 determines a pair of a participant Ux and a spectator Uy, who will be players of the competitive video game, depending on the grade of the participant Ux.

The game controller 41 executes the game procedures Sa for a match to be played by the pair of the participant Ux and the spectator Uy who have been determined by the player determiner 442 (Sf12). The competitive video game (match) played by the participant Ux and the spectator Uy is progressed, and it is determined that one of them is the winner based on the result of the progress.

The reward provider 443 determines whether the spectator Uy has defeated the participant Ux (Sf13). When the spectator Uy has defeated the participant Ux (Sf13: YES), the reward provider 443 determines how many points P as a reward are provided to the spectator Uy (hereafter, "reward amount") (Sf14). In the first embodiment, the reward provider 443 determines the reward amount depending on the grade of the participant Ux in the match contest. Specifically, the reward provider 443 increases the reward amount as the participant Ux has a higher grade in the match contest. In one example, when the participant Ux has the n1-th (n1=1 to N) rank in the match contest, the reward amount exceeds that of the n2-th (n2=1 to N, and n1≠n2) rank that is lower than the n1-th rank.

The reward provider 443 provides the spectator Uy with points P, which is the reward amount for winning against the participant Ux (Sf15). Specifically, as to the identification information Dy on the spectator Uy, the reward provider 443 adds the reward amount to the points P stored in the storage device 12. In contrast, when the spectator Uy has been defeated by the participant Ux (Sf13: NO), the determination of the reward amount (Sf14) and the provision of a reward (Sf15) are not executed. However, the spectator Uy who has been defeated by the participant Ux may be provided with a reward.

The second contest manager 44 determines whether a condition for terminating the special contest (hereafter, "second termination condition") is satisfied (Sf16). In one example, the second termination condition is defined as the end of the matches played by: the participant Ux; and all the spectators Uy who are linked with the configuration information Zn. However, the second termination condition is not limited to such an example. In one example, the second termination condition may be defined as a predetermined time being elapsed from the start of the special contest, or it may be defined as the number of the matches (the number of the matches played by the participant Ux and the spectators Uy) being reached a predetermined number of times, or it may be defined as the participant Ux being defeated by a spectator Uy.

When the second termination condition is not satisfied (Sf16: NO), another spectator Uy, who corresponds to the configuration information Zn and has not yet taken part in a match, is selected as a new player who plays against the participant Ux (Sf11). Thereafter, the game procedures Sa for the competitive video game (Sf12) and the provision of a reward depending on the condition for winning against the participant Ux (Sf13 to Sf15) are repeated. When the second termination condition is satisfied (Sf16: YES), the controller 11 terminates the second management procedures Sf.

As described above, in the first embodiment, a match contest in which more than one participant Ux takes part is managed. It is determined that any one of the participant Ux who took part in the match contest and any one is of spectators Uy whose registration request R is accepted will be players of the match contest. Accordingly, it is possible to motivate a large number of spectators Uy to play the competitive video game.

In the first embodiment, in response to a registration request R from the terminal apparatus 20 to distribute a distribution video V of the match contest, a spectator Uy of the terminal apparatus 20 is registered. In this configuration, by watching the distribution video V, spectators Uy, who desire to play against participants Ux who took part in the match contest, are effectively led to matches to be held in the special contest. Thus, it is possible to improve motivation of a large number of spectators Uy to take part in the special contest (finally, to play the competitive video game).

In the first embodiment, a pair of a participant Ux and a spectator Uy who will take part in the special contest depending on the grades of participants Ux who took part in the match contest. For this reason, it is possible to maintain spectators' Uy interest in the outcome of the match contest. This result enables the match contest to be more enjoyable.

Spectators Uy are provided with rewards when they win matches held in the special contest. As a result, it is possible to provide an incentive for the spectators Uy to take part in the special contest. In particular, in the first embodiment, the spectators Uy who have defeated the participants Ux are provided with rewards depending on the grades of the participants Ux in the match contest. As a result, it is possible to provide an incentive for the spectators Uy to defeat the participants Ux who have high grades in the match contest.

Second Embodiment

Description will be given of a second embodiment of the present disclosure. In the embodiments shown in the following, elements having the same functions as in the first embodiment are denoted by the same reference numerals as used for like elements in the description of the first embodiment, and detailed description thereof is omitted, as appropriate.

In the first embodiment, the registration acceptor 441 executes the acceptance procedures Sd after the end of the match contest to accept registration requests R from the terminal apparatuses 20 of the spectators Uy (Sd14). In the second embodiment, the registration acceptor 441 accepts registration requests R from the terminal apparatuses 20 of the spectators Uy in conjunction with the progress of the match contest.

Figure 15:
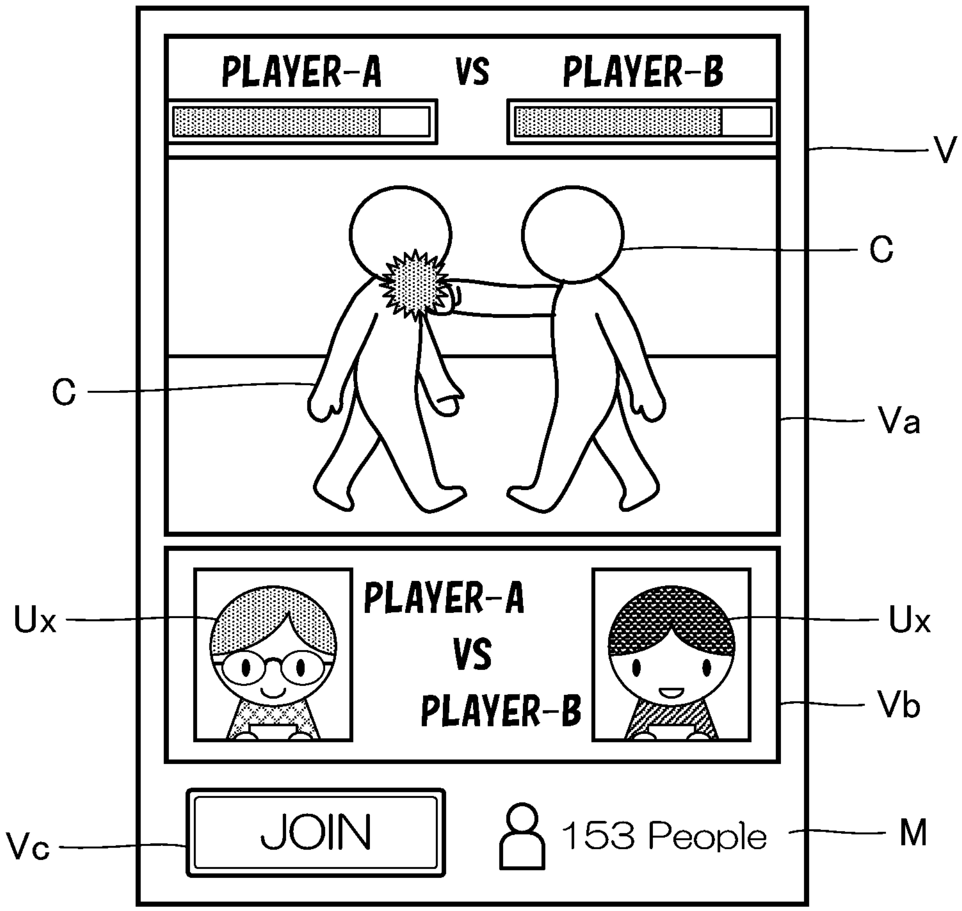
FIG. 15 is a schematic diagram of a distribution video according to a second embodiment.

FIG. 15 is a schematic diagram of a distribution video V according to the second embodiment. As shown in FIG. 15, a distribution video V according to the second embodiment includes a manipulation image Vc and the number of registered users M in addition to a competitive play video Va and a relevant video Vb according to the first embodiment. The number of registered users M represents the total number of spectators Uy whose registration requests R are accepted by the registration acceptor 441. The more registration requests R are accepted by the registration acceptor 441, the more the number of registered users M increases. That is, the number of registered users M increases over time with the progress of the match contest. The manipulation image Vc refers to a software button that is used for the spectator Uy to send a registration request R. The manipulation image Vc is manipulated by the spectator Uy who desires to take part in the special contest with use of the input operation device 25. The video distributor 43 executes the distribution procedures Sc to generate video data Q representative of a distribution video V including a competitive play video Va, a relevant video Vb, a manipulation image Vc and a number of registered users M (Sc13). Thereafter, the video distributor 43 transmits video data Q representative of the distribution video V to each terminal apparatus 20 (Sc14).

Figure 16:
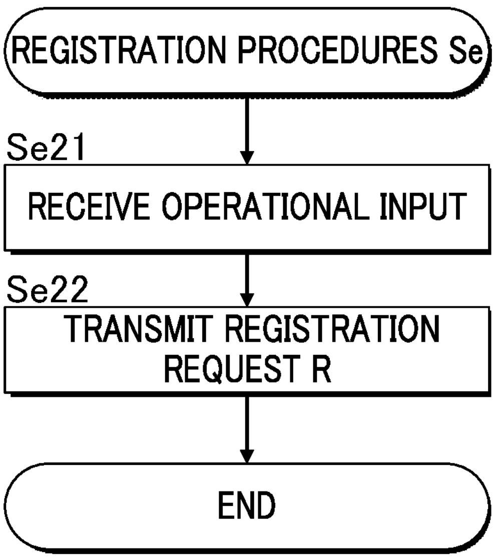
FIG. 16 is a flowchart showing an example of registration procedures according to the second embodiment.

FIG. 16 is a flowchart showing the registration procedures Se performed by the controller 21 of each terminal apparatus 20 according to the second embodiment. During the progress of the match contest, each spectator Uy can manipulate the manipulation image Vc at any time while watching the distribution video V. The controller 21 receives an operational input of the manipulation image Vc by the spectator Uy (Se21). In response to receiving the operational input of the manipulation image Vc, the controller 21 transmits a registration request R via the communication device 23 to the control system 10 (Se22). The registration request R includes identification information Dy of the spectator Uy.

Figure 17:
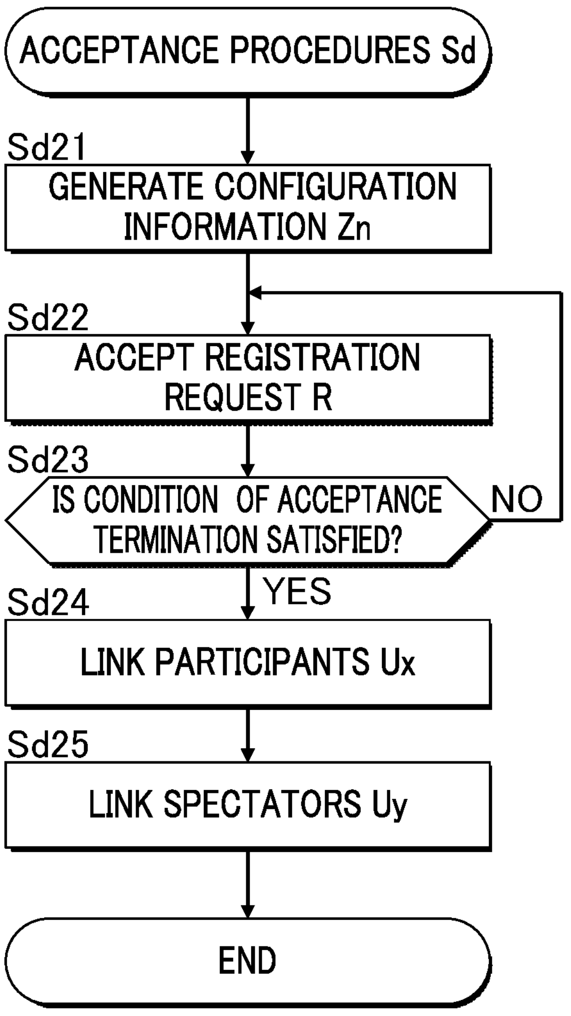
FIG. 17 is a flowchart showing acceptance procedures according to the second embodiment.

FIG. 17 is a flowchart showing the acceptance procedures Sd according to the second embodiment. In one example, in response to an instruction made by the operator, the controller 11 starts the acceptance procedures Sd with the start of the match contest. The controller 11 may start the acceptance procedures Sd in the middle of the match contest (e.g., at a time at which a predetermined time has elapsed from the start). In the second embodiment, the acceptance procedures Sd are executed in conjunction with the first management procedures Sb and the distribution procedures Sc.

When the acceptance procedures Sd have started, the player determiner 442 generates N pieces of configuration information Z1 to ZN in a manner similar to the first embodiment (Sd21). The registration acceptor 441 accepts registration requests R of the spectators Uy (Sd22). Specifically, the registration acceptor 441 accepts registration requests R transmitted from the terminal apparatuses 20 of the spectators Uy via the communication device 13.

The registration acceptor 441 determines whether a condition of acceptance termination is satisfied (Sd23). In one example, the condition of acceptance termination according to the second embodiment is defined as the end of the match contest, or a predetermined time being elapsed from the end of the match contest. When the condition of acceptance termination is not satisfied (Sd23: NO), the registration acceptor 441 repeats the acceptance of the registration requests R (Sd22). That is, the registration acceptor 441 accepts registration requests R one by one in conjunction with the progress of the match contest. The identification information Dy included in each registration request R accepted by the registration acceptor 441 is stored in the storage device 12. The number of times registration requests R have been accepted by the registration acceptor 441 is included in the distribution video V as the number of registered users M.

So as to satisfy the condition of acceptance termination, the grades of the participants Ux have been already determined due to the end of the match contest (Sb17). When the condition of acceptance termination is satisfied (Sd23: YES), the player determiner 442 links each of the N pieces of configuration information Z1 to ZN with one participant Ux (Sd24). Specifically, in a manner similar to the first embodiment, one piece of configuration information Zn is linked with one participant Ux depending on the grade thereof in the match contest. In one example, the player determiner 442 links the n-th configuration information Zn with identification information Dx about the n-th participant Ux in the match contest.

The player determiner 442 links each of the N pieces of configuration information Z1 to ZN with spectators Uy of the terminal apparatuses 20 that transmitted registration requests R (Sd25). Specifically, the player determiner 442 allocates a predetermined number of spectators Uy to each of the N pieces of configuration information Z1 to ZN in order of acceptance of their registration requests R by the registration acceptor 441. In one example, the configuration information Z1 is linked with pieces of identification information Dy about 10 spectators Uy: 1st to 10th spectators in order of acceptance of their registration requests R. The configuration information Z2 is linked with pieces of identification information Dy about 10 spectators Uy: 11th to 20th spectators in order of acceptance of their registration requests R. In other words, more than one spectator Uy is divided into N groups in the order of acceptance of their registration requests R. The n-th group is allocated to configuration information Zn. As described above, in the second embodiment, the player determiner 442 links each of the N pieces of configuration information Z1 to ZN with a predetermined number of spectators Uy based on the order of acceptance of their registration requests R.

Each of the pieces of configuration information Zn may be linked with a different number of spectators Uy. The allocation of participants Ux to the configuration information Zn (Sd24) may be after the allocation of spectators Uy to the configuration information Zn (Sd25).

The second management procedures Sf following the acceptance procedures Sd are the same as those of the first embodiment. The player determiner 442 determines a pair of a participant Ux and a spectator Uy. The pair of them will be players in the match contest (Sf11). Specifically, the player determiner 442 determines a pair of two: a participant Ux linked with the configuration information Zn; and the first spectator Uy who has not yet played from among the spectators Uy linked with the configuration information Zn. The pair of them will be players in the match contest. In the second embodiment, players are automatically determined by the player determiner 442 in such a manner. As a result, registration request R can be accepted before the end of the match contest (before the ranks of the participants Ux are determined).

The second embodiment has the same effects as in the first embodiment. Furthermore, in the second embodiment, registration requests R are accepted in conjunction with the progress of the match contest (in the middle of the match contest). In one example, spectators Uy are registered for the special contest in a state in which the spectators Uy watch a distribution video V and are interested in the battle game more. As a result, it is possible to improve motivation of a large number of spectators Uy to perform a registration as compared to the first embodiment in which acceptance of registration requests R is started after the end of the match contest. Furthermore, in the second embodiment, spectators Uy are linked with a corresponding piece of configuration information Zn based on the order of acceptance of the registration requests R. It is possible to motivate spectators Uy to perform an early registration.

Modifications

The embodiments described above may be modified in various ways. Examples of specific modifications that are applied to the embodiments will now be described. Two or more modes freely selected among the following may also be combined as long as they do not conflict.

(1) In the foregoing embodiments, an example is given in which all of the participants Ux who took part in the match contest also take part in the special contest. Some of the participants Ux who took part in the match contest may take part in the special contest. In one example, N participants Ux selected from the participants Ux who took part in the match contest may take part in the special contest. In another example, the top N participants Ux in the order of the grades in the match contest from among the participants Ux may take part in the special contest.

(2) In the foregoing embodiments, spectators Uy are linked with a corresponding piece of configuration information Zn in order of acceptance of their registration requests R. However, methods for determining a link of the spectators Uy with a participant Ux are not limited to such an example. In one example, spectators Uy may be linked with a participant Ux in order of priority for the spectators Uy. The priority for the spectators Uy is set based on: the number of points P of each spectator Uy; the total play time of the competitive video game for each spectator Uy; or the ability (e.g., level) of each spectator Uy or a character C in the match. In this configuration, the priority of each spectator Uy is set based on order of the acceptance of their registration requests R.

Figure 18:
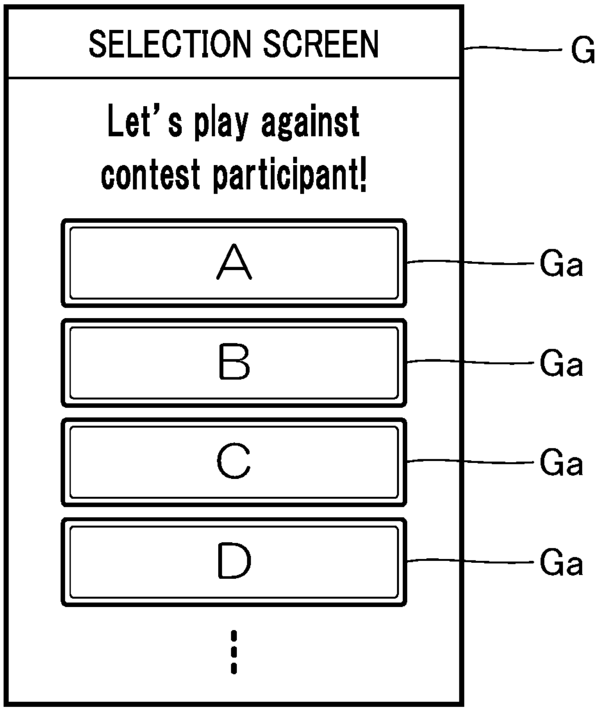
FIG. 18 is a schematic diagram of a selection screen according to a modification.

(3) In one aspect, a specific participant Ux may be selected by each spectator Uy from among more than one participant Ux, and the specific participant Ux will be an opponent player of the special contest. In one example, as shown in FIG. 18, names or titles of the participants Ux may be displayed on the respective options Ga in the selection screen G. The option Ga showing the specific participant Ux with whom the spectator desires to compete is selected by the spectator Uy. A registration request R includes configuration information Zn about the option Ga selected by the spectator Uy as well as indication information Dy about this spectator Uy. This is similar to that of the first embodiment. The configuration information Zn is also called "information for identifying participants Ux."

(4) Spectators Uy who are allowed to take part in the special contest may be limited. In one example, an aspect is given in which only spectators Uy who satisfy a predetermined condition are allowed to take part in the special contest. Examples of these spectators Uy include one whose points P exceed a predetermined points, one whose total play time of the competitive video game exceeds a predetermined time, and one whose ability of the character C exceeds a predetermined value. Payment of the registration fee by spectators Uy may be a condition of participation in the special contest.

(5) In the foregoing embodiments, an example is given in which the spectator Uy who has defeated a participant Ux is provided with points P as a reward. However, the content of the reward provided to the spectator Uy by the reward provider 443 is not limited to such an example. The reward may be items or a character usable in the competitive video game. Alternatively, the reward may be rights for participation in the next match contest, or it may be rights for advantageous participation in the next match contest (e.g., seed right). The reward may be a tangible entity related to the competitive video game, which will be shipped to the spectator Uy who defeated the participant Ux.

(6) In the foregoing embodiments, an example is given in which spectators Uy, who are other than the participants Ux who took part in the match contest, play against the participants Ux in the special contest. However, participants Ux who took part in the match contest may play against other participants Ux in the special contest. In one example, participants Ux who have lost in the middle of the match contest may play the competitive video game in the special contest and compete with participants Ux who have high grades in the match contest. As is apparent from these examples, players against whom participants Ux will play in the match contest are determined by the player determiner 442, and these players are categorized as users U including spectators Uy and participants Ux.

(7) In the foregoing embodiments, an example is given in which the control system 10 includes a video distributor 43 that distributes a distribution video V of the match contest. The video distributor 43 may be omitted from the control system 10. It is noted that watching the distribution video V leads to increase user U's interest in the battle game. In view of improving motivation of a large number of users U to take part in the special contest, it is preferred that the distribution video V of the match contest be distributed to each terminal apparatus 20.

(8) In the foregoing embodiments, an example is given in which the control system 10 includes a game controller 41, a first contest manager 42, a video distributor 43 and a second contest manager 44. However, where each element is provided is not limited to such an example. In one example, each terminal apparatus 20 may include one of, some of, or all of the functions of the game controller 41.

The game system for progressing the match contest may be independent from the video distribution system for distributing the distribution video V. Specifically, the game system includes a game controller 41, and the video distribution system includes a video distributor 43. Furthermore, the second contest manager 44 is implemented by cooperation between the game system and the video distribution system. In one example, the video distribution system includes a registration acceptor 441 of the second contest manager 44. The game system includes a player determiner 442 and a reward provider 443 of the second contest manager 44.

In the configuration of the control system 10 including a game controller 41 and a video distributor 43, the control system 10 manages participants Ux and spectators Uy using identification information D (Dx and Dy) to be issued by the common system. However, in an example in which the game system is independent from the video distribution system, identification information Dx for the game system to identify participants Ux has code sequences of a different system from identification information Dy for the video distribution system to identify spectators Uy. In this configuration, the control system 10 stores identification information Dx of a participant Ux linked with identification information Dy of a spectator Uy in the storage device 12 in the special contest.

Furthermore, another configuration is given in which an identification code issued by the game system or the video distribution system is linked with the identification information Dy about a spectator Uy. The control system 10 links identification information Dx of a participant Ux with an identification code of a spectator Uy, to progress the competitive video game in the special contest. The control system 10 may use the identification code of each spectator Uy, to acquire, from the video distribution system, information required for participation in the special contest. In one example, registration requests R are accepted by the video distribution system (registration acceptor 441), and the accepted registration requests R, which are used as information required for the spectators Uy to take part in the special contest, are acquired by the control system 10 from the video distribution system. Of the various information about spectators Uy managed by the video distribution system, only the information required for participation in the special contest may be given to the control system 10. Such a configuration is preferred in view of security, such as protection of personal information.

(9) In the foregoing embodiments, an example is given of video data Q representative of a distribution video V, but the content of the video data Q is not limited to such an example. In one example, the video data Q may represent elements comprising the distribution video V or positions of the elements. The controller 21 of a terminal apparatus 20 generates a distribution video V using such video data Q, to display the distribution video V on the display 24. A part of the distribution video V may be stored in the storage device 22 of the terminal apparatus 20. The controller 21 generates a distribution video V by adding an image stored in the storage device 32 to the video indicated by the video data Q, and it displays the distribution video V on the display 24.

As is apparent from this description, the video data Q is expressed as data for displaying the distribution video V on the display 24. The concept of the video data Q includes data used for display processing for the distribution video V (e.g., data used to generate the distribution video V) in addition to data of the distribution video V.

(10) In the foregoing embodiments, an example is given in which each user U plays the competitive video game using the terminal apparatus 20 that plays back a distribution video V. However, a terminal apparatus 20 as a playback device for the distribution video V may be independent from another terminal apparatus 20 as a game play device for a user U.

In the foregoing embodiments, an example is given in which one terminal apparatus 20 corresponds to one participant Ux. However, one terminal apparatus 20 may be used in turn by more than one participant Ux. It is not necessary to prepare one terminal apparatuses 20 for each participant Ux.

(11) In the foregoing embodiments, an example is given in which the special contest stats after the end of the match contest. However, the special contest may start in the middle of the match contest. That is, the acceptance procedures Sd and the second management procedures Sf may start before the end of the match contest. In the special contest, the competitive video game is played by: participants Ux who have lost in the middle of the match contest; and a spectator Uy who was registered in response to a registration request R. As is apparent from this description, a period of the match contest and a period of the special contest may overlap each other.

(12) In each of the foregoing embodiments, an example is given in which the match contest between users U is controlled by the game controller 41 of the control system 10 (cloud gaming). However, two terminal apparatuses 20 of two users U, who are selected by the control system 10, may communicate directly with each other (P2P: Peer to Peer) to proceed the match contest. Specifically, upon determining players, the control system 10 notifies, to each of the two terminal apparatuses 20 of the two users U, the address of the opponent user's terminal apparatus 20. Each terminal apparatus 20 communicates with the terminal apparatus 20 specified by the address notified from the control system 10 to progress the match contest.

(13) In the foregoing embodiment, an example is given of a battle video game played by two users U. However, the type of video games is not limited to such an example. The video game may be a game played by three or more users U, or it may be a game played by teams composed of one or more users U, or it may be a game in which each user's grade is determined by the points acquired in the video game. The users U are not required to directly play against each other in the video game. Examples of a video game to be executed in the match contest or the special contest include: a competitive sports video game or a competitive board video game played by more than one user U; a music video game in which users U operate the game to music; an action video game in which users U operate characters C to complete various missions; and an exploration video game in which users U operate characters C to search for various places.

(14) The functions of the control system 10 according to the foregoing embodiments are implemented by cooperation of one or more processors comprising the controller 11 and a program stored in the storage device 12. The program according to the foregoing embodiments may be provided in a form recorded in a computer readable recording medium, and the program may be installed on a computer. The recording medium is, for example, a non-transitory recording medium, the preferred example of which is an optical recording medium (optical disk), such as a CD-ROM. Examples of the recording medium further include any known type of recording medium, such as a semiconductor recording medium, and a magnetic recording medium. The non-transitory recording medium include any recording medium excluding the transient propagating signal. The volatile recording medium is not excluded. In a configuration in which the distribution apparatus distributes a program through a network, the storage device that stores the program in the distribution apparatus corresponds to the non-transitory recording medium.

Appendices

The following example aspects are derivable from the foregoing description. For improving understanding of the aspects, reference signs used in the drawings are shown in parentheses, but these are not intended to limit the present disclosure to the drawings.

Appendix 1

A control system (10) according to one aspect (Appendix 1) of the present enclosure includes: at least one memory that stores instructions; and at least one processor that implements the instructions to: manage a contest in which a plurality of participants (Ux) play a competitive video game; accept a registration request (R) of each of a plurality of users (U); and determine a pair of any participant of the plurality of participants and any user of the plurality of users, wherein the pair will be players of the competitive video game.

In this aspect, the contest in which the participants (Ux) play the competitive video game is managed. It is determined, as players of the competitive video game, any participant of the participants (Ux) in the contest and any user of the users (U) whose registration request (R) is accepted. As a result, it is possible to motivate a large number of users (U) to play the competitive video game.

The "(competitive) video game" is a video game played by more than one participant (Ux). The "competitive video game" according to the present disclosure includes, in addition to a competitive video game played by two participants (Ux), a competitive video game played by three or more persons, and a competitive video game played by a team as a unit that constitutes two or more participants (Ux).

It is not required for more than one participant (Ux) to play directly the competitive video game. In one example, in a contest, in which the winner is determined among the participants (Ux) based on scores obtained by the competitive video game played by each participant (Ux), it is not required for more than one participant (Ux) to directly play the competitive video game.

In one example, the management of the contest by the contest manager (42) includes at least one of the following: (1) determination of players of the participants (Ux); (2) progress of the competitive video game; and (3) management of the grade of each participant (Ux). Typically, the "users (U)" are ones other than the participants Ux of the contest. However, a participant (Ux) who lost in the contest may play against another participant (Ux), who is one of the users (U).

The registration request (R) may be accepted after the end of the contest, or it may be accepted in conjunction with the contest. The participant (Ux) and the user (U) play against each other after the end of the contest. However, a participant (Ux) who lost in the middle of the contest may play against a user (U) who is determined by the player determiner (442) before the end of the contest.

Appendix 2

In the control system (10) according to a specific example (Appendix 2) of Appendix 1, the at least one processor further implements the program to: distribute, to a terminal apparatus (20), video data (Q) that is used to display a video (V) related to the contest in conjunction with progress of the contest, and accept a registration request (R) transmitted from the terminal apparatus (20).

In this aspect, the registration request (R) is accepted from the terminal apparatus (20) to which the video (V) related to the contest is distributed. As a result, it is possible to improve motivation of a large number of users (U) who watch the video (V) to play the competitive video game.

The "video (V) related to the contest" is, typically, an image representative of the situation of the competitive video game played by the participants (Ux) in the contest. However, the video (V) representative of how the entire of the contest is performed in the venue may be distributed to the terminal apparatus (20).

Appendix 3

In a specific example (Aspect 3) according to Aspect 1 or 2, the at least one processor further implements the program to accept the registration request in conjunction with progress of the contest.

In this aspect, in the conjunction with the progress of the contest (i.e., in the middle of the contest), the registration request (R) is accepted. Thus, as compared to a configuration in which the acceptance of the registration request (R) is started after the end of the contest, it is possible to motivate a large number of users (U) to register.

Appendix 4

In a specific example (Appendix 4) according to any one of Appendices 1 to 3, the at least one processor further implements the program to: manage a grade of each of the plurality of participants (Ux) in the contest; and determine, depending on the grade of each of the plurality of participants (Ux), the pair of the participant (Ux) and the user (U).

In this aspect, the pair of a participant (Ux) and a user (U) is determined depending on the grade of each of the participants (Ux) who take part in the event. This result enables the match contest to be more enjoyable. The phrase "determining the pair of a participant (Ux) and a user (U) based on the outcome of the match" means that the pair of them depends on the outcome of the match.

Appendix 5

In a specific example (Appendix 5) according to Appendix 4, the at least one processor further implements the program to: link each of a plurality pieces of configuration information (Zn) with: any user (U) of the plurality of users; and any participant (Ux) who is one of the plurality of participants and is determined depending on the grades; and determine, as players of the competitive video game, a pair of a user and a participant who are linked with each other for each of the plurality pieces of configuration information.

According to this aspect, the participant (Ux) as a player who plays against each user (U) can be selected depending on the grade of the participant (Ux).

In one example, the "configuration information (Zn)" refers to identification information that is used to identify a virtual room in which the participant (Ux) and the user (U) play against each other. A typical processing of linking each piece of configuration information (Zn) with a participant (Ux), who is one of the participants (Ux) and is depending on the grade, corresponds to processing for linking the n-th (n is a natural number) configuration information (Zn) from among pieces of configuration information (Zn) with the n-th participant (Ux).

Appendix 6

In a specific example (Appendix 6) according to Appendix 5, the at least one processor further implements the program to link each of the plurality pieces of configuration information (Zn) with a predetermined number of users (U) from among the plurality of users, the predetermined number of users depending on order of acceptance of the registration request (R).

According to this aspect, the predetermined number of users (U) is linked with the configuration information (Zn) in order of registration. It is possible to motivate users (U) to perform an early registration.

Appendix 7

The control system (10) of an aspect (Aspect 7) according to any one of Appendices 1 to 6, the at least one processor further implements the program to: control the competitive video game played by the participant (Ux) and the user (U) who are related to the pair; and provide a reward for the user when the user defeats the participant.

According to this configuration, the user (U) is provide with the reward when the user wins the video game (match) in which the pair is determined. As a result, it is possible to provide an incentive for a large number of users (U) to play against the participant (Ux).

The (competitive) video game controlled by the game controller (41) and the video game executed in the contest are typically the same. However, the two may not be exactly the same. In one example, although the video game title is the same, the video game controlled by the game controller (41) and the video game executed in the contest may differ from each other in a game mode. In the contest, the video game may be executed in a normal mode. In the contest in which a user (U) and a participant (Ux) play against each other, the video game may be executed in the limited mode, in which various conditions are limited.

Appendix 8

In a specific example (Appendix 8) according to Appendix 7, the at least one processor further implements the program to: manage a grade of each of the plurality of participants (Ux) in the contest; and provide a reward depending on the grade of the participant for the user (U) who defeats the participant.

According to this aspect, it is possible to provide an incentive for the user (U) to defeat the participant (Ux) who has high grade in the contest.

The “reward depending on the grade of the participant (Ux)” means that the type or quantity of reward changes based on the grade thereof. In one aspect, the higher the grade of the participant (Ux), the higher the values of the reward may be provided to the user (U). Alternatively, the higher the participant (Ux), the greater the number of rewards is provided to the user (U).

Appendix 9

A computer-implemented operation method for a control system (10) of Appendix 9 is an operation method including: managing a contest in which a plurality of participants play a competitive video game; accepting, a registration request of each of a plurality of users; and determining a pair of any participant of the plurality of participants and any user of the plurality of users, in which the pair will be players of the competitive video game.

Appendix 10

A recording medium of Appendix 10 is a non-transitory computer-readable recording medium having a program stored therein that cause at least one processor of a computer system to: manage a contest in which a plurality of participants play a competitive video game; accept a registration request of each of a plurality of users; and determine a pair of any participant of the plurality of participant; and any user of the plurality of users, in which the pair will be players of the competitive video game.

DESCRIPTION OF REFERENCE SIGNS

100 . . . Information system, 200 . . . network, 10 . . . control system, 11 and 21 . . . controller, 12 and 22 . . . storage device, 13 and 23 . . . communication device, 20 . . . terminal apparatus, 24 . . . display, 25 . . . input operation device, 41 . . . game controller, 42 . . . first contest manager, 43 . . . video distributor, 44 . . . second contest manager, 441 . . . registration acceptor, 442 . . . player determiner, 443 . . . reward provider.

What is claimed is:

1. A control system comprising:
at least one memory that stores a program; and
at least one processor that implements the program to:
execute a first contest in which a plurality of participants play a competitive video game over a network;
in real time during the competitive video game, receive, over the network from a terminal apparatus of each of a plurality of spectators who are viewing the competitive video game in real time, a registration request to play in a second contest of the competitive video game;
in response to receiving the registration requests, determine a pair of:
one participant of the plurality of participants who have played in the competitive video game; and
one spectator of the plurality of spectators from whom the registration requests are received; and
execute the second contest of the competitive video game in which the pair play the competitive video game, in the middle of the first contest of the competitive video game.

2. The control system according to claim 1,
wherein the at least one processor further implements the program to:
in real time during the competitive video game, distribute, over the network to the plurality of terminal apparatuses of the plurality of spectators, video data that is used to display a video related to the first contest on the plurality of terminal apparatuses in conjunction with progress of the first contest, and
in response to the distribution of the video data, receive the registration request from the plurality of terminal apparatuses.

3. The control system according to claim 1,
wherein the at least one processor further implements the program to:
manage a grade of each of the plurality of participants in the competitive video game; and
determine, depending on the grade of each of the plurality of participants, the pair of the one participant and the one spectator.

4. The control system according to claim 3,
wherein the at least one processor further implements the program to:
link each of a plurality pieces of configuration information with:
any spectator of the plurality of spectators; and
any participant who is one of the plurality of participants and is determined depending on the grades; and
determine, as the players of the competitive video game, a pair of a spectator and a participant who are linked with each of the plurality pieces of configuration information.

5. The control system according to claim 4,
wherein the at least one processor further implements the program to divide the plurality of spectators from whom the registration requests are received into N groups in order of acceptance of the registration requests, and allocate each of the N groups to one of the plurality pieces of configuration information.

6. The control system according to claim 1,
wherein the at least one processor further implements the program to:
control the second contest of the competitive video game; and
provide a reward for the one spectator when the spectator defeats the one participant.

7. The control system according to claim 6,
wherein the at least one processor further implements the program to:
manage a grade of each of the plurality of participants in the first contest; and
provide a reward depending on the grade of the one participant for the one spectator who defeats the one participant in the second contest.

8. The control system according to claim 1, wherein the first contest is a match contest, and the second contest is a special contest, and
wherein the at least one processor further implements the program to, after the special contest played by the pair ends, execute a new special contest in which a new pair plays in the competitive video game.

9. A computer-implemented operation method for a control system, the operation method comprising:
executing a first contest in which a plurality of participants play a competitive video game over a network;
in real time during the competitive video game, receiving, from a terminal apparatus of each of a plurality of spectators who are viewing the competitive video game in real time, a registration request to play in a second contest of the competitive video game;

in response to receiving the registration requests, determining a pair of:

one participant of the plurality of participants who have played in the competitive video game; and one spectator of the plurality of spectators from whom the registration requests are received; and executing the second contest of the competitive video game in which the pair play the competitive video game, in the middle of the first contest of the competitive video game.

10. The computer-implemented operation method according to claim 9, further comprising:

in real time during the competitive video game, distributing, over the network to the plurality of terminal apparatuses of the plurality of spectators, video data that is used to display a video related to the first contest on the plurality of terminal apparatuses in conjunction with progress of the first contest, and in response to the distribution of the video data, receiving the registration request from the plurality of terminal apparatuses.

11. The computer-implemented operation method according to claim 9, further comprising:

managing a grade of each of the plurality of participants in the competitive video game; and determining, depending on the grade of each of the plurality of participants, the pair of the participant and the spectator.

12. The computer-implemented operation method according to claim 11, further comprising:

linking each of a plurality pieces of configuration information with:

any spectator of the plurality of spectators; and any participant who is one of the plurality of participants and is determined depending on the grades; and determining, as the players of the competitive video game, a pair of a spectator and a participant who are linked with each of the plurality pieces of configuration information.

13. The computer-implemented operation method according to claim 12, further comprising:

dividing the plurality of spectators from whom the registration requests are received into N groups in order of acceptance of the registration requests, and allocating each of the N groups to one of the plurality pieces of configuration information.

14. A non-transitory computer-readable recording medium having a program stored therein that causes at least one processor of a computer system to:

control a first contest in which a plurality of participants play a competitive video game over a network;

in real time during the competitive video game, receive, over the network from a terminal apparatus of each of a plurality of spectators who are viewing the competitive video game in real time, a registration request to play in a second contest of the competitive video game;

in response to receiving the registration requests, determine a pair of:

one participant of the plurality of participants who have played in the competitive video game; and one spectator of the plurality of spectators from whom the registration requests are received; and control the second contest of the competitive video game in which the pair play the competitive video game, in the middle of the first contest of the competitive video game.

15. The non-transitory computer-readable recording medium according to claim 14, wherein the first contest is a match contest, and the second contest is a special contest, and wherein the program further causes the at least one processor of the computer system to, after the special contest played by the pair ends, execute a new special contest in which a new pair plays in the competitive video game.

16. The non-transitory computer-readable recording medium according to claim 14, wherein the program further causes the at least one processor of the computer system to:

in real time during the competitive video game, distribute, over the network to the plurality of terminal apparatuses of the plurality of spectators, video data that is used to display a video related to the first contest on the plurality of terminal apparatuses in conjunction with progress of the first contest, and in response to the distribution of the video data, receive the registration request from the plurality of terminal apparatuses.

17. The non-transitory computer-readable recording medium according to claim 14, wherein the program further causes the at least one processor of the computer system to:

manage a grade of each of the plurality of participants in the first contest; and determine, depending on the grade of each of the plurality of participants, the pair of the participant and the spectator.

18. The non-transitory computer-readable recording medium according to claim 17, wherein the program further causes the at least one processor of the computer system to:

link each of a plurality pieces of configuration information with:

any spectator of the plurality of spectators; and any participant who is one of the plurality of participants and is determined depending on the grades; and determine, as the players of the competitive video game, a pair of a spectator and a participant who are linked with each of the plurality pieces of configuration information.

19. The non-transitory computer-readable recording medium according to claim 18, wherein the program further causes the at least one processor of the computer system to:

divide the plurality of spectators from whom the registration requests are received into N groups in order of acceptance of the registration requests, and allocate each of the N groups to one of the plurality pieces of configuration information.

20. The computer-implemented operation method according to claim 9, wherein the first contest is a match contest, and the second contest is a special contest, and wherein the computer-implemented operation method further comprises:

after the special contest played by the pair ends, executing a new special contest in which a new pair plays in the competitive video game.

* * * * *